United States Patent
Kim et al.

(10) Patent No.: US 11,757,090 B2
(45) Date of Patent: Sep. 12, 2023

(54) ANODE ACTIVE MATERIAL FOR LITHIUM SECONDARY BATTERY AND LITHIUM SECONDARY BATTERY COMPRISING ANODE INCLUDING THE ANODE ACTIVE MATERIAL

(71) Applicant: Samsung SDI Co., Ltd., Yongin-si (KR)

(72) Inventors: Deokhyun Kim, Yongin-si (KR); Jaehyuk Kim, Yongin-si (KR); Jaemyung Kim, Yongin-si (KR); Soonsung Suh, Yongin-si (KR); Hana Yoo, Yongin-si (KR); Yungu Cho, Yongin-si (KR); Heeyoung Chu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 273 days.

(21) Appl. No.: 15/963,873

(22) Filed: Apr. 26, 2018

(65) Prior Publication Data

US 2018/0316001 A1    Nov. 1, 2018

(30) Foreign Application Priority Data

Apr. 27, 2017    (KR) .......................... 10-2017-0054506

(51) Int. Cl.
  *H01M 4/36*    (2006.01)
  *H01M 4/48*    (2010.01)
  (Continued)

(52) U.S. Cl.
  CPC ............ *H01M 4/364* (2013.01); *H01M 4/134* (2013.01); *H01M 4/386* (2013.01); *H01M 4/483* (2013.01);
  (Continued)

(58) Field of Classification Search
  CPC ....... H01M 4/386; H01M 4/362; H01M 4/364
  See application file for complete search history.

(56) References Cited

U.S. PATENT DOCUMENTS

2003/0215711 A1    11/2003    Aramata et al.
2005/0233213 A1*   10/2005    Lee .......................... H01M 4/13
                                                              423/325
(Continued)

FOREIGN PATENT DOCUMENTS

JP           3952180 B2      5/2007
JP       2008153117 A   *   7/2008
(Continued)

OTHER PUBLICATIONS

JP2008153117A Original and Translation from Espacenet (Year: 2008).*

(Continued)

*Primary Examiner* — Nathanael T Zemui
(74) *Attorney, Agent, or Firm* — Lewis Roca Rothgerber Christie LLP

(57) ABSTRACT

Anode active materials for lithium secondary batteries are provided. According to embodiments of the present disclosure, an anode active material includes: i) a first composite including at least two active silicon materials having different crystal sizes and a silicon oxide ($SiO_x$) material (wherein $0<x\leq2$); ii) a second composite including an active silicon material having a crystal size of about 24 nm or greater and a silicon oxide ($SiO_x$) material (wherein $0<x\leq2$), mixed with a carbonaceous material; or a mixture or combination of (i) and (ii). A lithium secondary battery is provided including an anode including any one of the anode active materials.

10 Claims, 13 Drawing Sheets

(51) Int. Cl.
*H01M 4/62* (2006.01)
*H01M 4/38* (2006.01)
*H01M 4/134* (2010.01)
*H01M 10/0525* (2010.01)
*H01M 4/02* (2006.01)

(52) U.S. Cl.
CPC ........ *H01M 4/625* (2013.01); *H01M 10/0525* (2013.01); *H01M 2004/027* (2013.01)

(56) References Cited

U.S. PATENT DOCUMENTS

| | | | |
|---|---|---|---|
| 2006/0166098 A1 | 7/2006 | Tabuchi et al. | |
| 2009/0169994 A1 | 7/2009 | Mah et al. | |
| 2013/0136988 A1* | 5/2013 | Tanaka | H01M 4/133 429/220 |
| 2013/0337314 A1* | 12/2013 | Essaki | H01M 4/133 429/163 |
| 2014/0030599 A1* | 1/2014 | Lee | H01M 4/485 429/231.8 |
| 2014/0162129 A1 | 6/2014 | Kim et al. | |
| 2014/0242469 A1* | 8/2014 | Yamamoto | H01M 4/364 429/231.8 |
| 2014/0248538 A1* | 9/2014 | Lim | C01B 33/113 252/182.1 |
| 2014/0308193 A1* | 10/2014 | Nishimine | C01B 33/113 422/600 |
| 2015/0214544 A1 | 7/2015 | Kwon et al. | |
| 2015/0325839 A1* | 11/2015 | Put | H01M 4/366 252/182.1 |
| 2016/0072152 A1 | 3/2016 | Tsubouchi et al. | |
| 2016/0156031 A1 | 6/2016 | Kim et al. | |
| 2017/0170458 A1* | 6/2017 | Moon | H01M 4/587 |
| 2018/0261833 A1* | 9/2018 | Hirose | H01M 4/628 |

FOREIGN PATENT DOCUMENTS

| | | |
|---|---|---|
| JP | 2016-58130 | 4/2016 |
| KR | 10-2005-0007311 A | 1/2005 |
| KR | 10-2009-0072533 A | 7/2009 |
| KR | 10-2013-0096637 | 8/2013 |
| KR | 10-2014-0074739 A | 6/2014 |
| KR | 10-2015-0089390 A | 8/2015 |
| KR | 10-2016-0065028 | 6/2016 |

OTHER PUBLICATIONS

Kim, Hyejung et al.; "A New Coating Method for Alleviating Surface Degradation of $LiNi_{0.6}Co_{0.2}Mn_{0.2}O_2$ Cathode Material: Nanoscale Surface Treatment of Primary Particles"; Nano Lett.; vol. 15; 2015; 24pp.
Lim, Byung-Beom et al.; "Advanced Concentration Gradient Cathode Material with Two-Slope for High-Energy and Safe Lithium Batteries"; Adv. Funct. Mater.; 2015; vol. 25; pp. 4673-4680.
KIPO Notice of Allowance dated Jul. 15, 2021 in corresponding KR Application No. 10-2017-0054506, 3 pages.
KIPO Office action dated Apr. 20, 2021 in corresponding Korean Patent Application No. 2017-0054506, 5 pages.

* cited by examiner

ANODE ACTIVE MATERIAL FOR LITHIUM SECONDARY BATTERY AND LITHIUM SECONDARY BATTERY COMPRISING ANODE INCLUDING THE ANODE ACTIVE MATERIAL

CROSS-REFERENCE TO RELATED APPLICATION

This application claims priority to and the benefit of Korean Patent Application No. 10-2017-0054506, filed on Apr. 27, 2017, in the Korean Intellectual Property Office, the entire content of which is incorporated herein by reference.

BACKGROUND

1. Field

Aspects of one or more embodiments of the present disclosure relate to an anode active material for a lithium secondary battery, and a lithium secondary battery including an anode including the anode active material.

2. Description of the Related Art

With technological advances in portable electronic devices and communication devices, demand has increased for the development of lithium secondary batteries with high energy density.

A silicon-containing material may be used as an anode active material of a lithium secondary battery. Such a silicon-containing material may have a high capacity but poor lifetime characteristics compared to other anode active materials. Accordingly, further improvement is required in this regard.

SUMMARY

One or more aspects of embodiments of the present disclosure include an anode active material for a lithium secondary battery providing good initial efficiency and improved capacity and lifetime characteristics.

One or more aspects of embodiments of the present disclosure include a lithium secondary battery having improved cell performance by including an anode including the anode active material.

Additional aspects will be set forth in part in the description which follows and, in part, will be apparent from the description, or may be learned by practice of the presented embodiments.

According to one or more embodiments of the present disclosure, an anode active material for a lithium secondary battery includes a first composite including: at least two active silicon materials having different crystal sizes and a silicon oxide ($SiO_x$) material (wherein $0<x\leq2$).

According to one or more embodiments of the present disclosure, an anode active material for a lithium secondary battery includes: a second composite including active silicon having a crystal size of about 24 nm or greater and a silicon oxide ($SiO_x$) material (wherein $0<x\leq2$); and a carbonaceous material.

According to one or more embodiments of the present disclosure, an anode active material for a lithium secondary battery includes: i) a first composite including at least two active silicon materials having different crystal sizes and a silicon oxide ($SiO_x$) material (wherein $0<x\leq2$); and ii) a second composite including active silicon having a crystal size of about 24 nm or greater and a silicon oxide ($SiO_x$) material (wherein $0<x\leq2$), and a carbonaceous material (e.g., a second composite mixed with a carbonaceous material).

According to one or more embodiments of the present disclosure, a lithium secondary battery includes: a cathode including a cathode active material; an anode including one of the anode active materials according to the above-described embodiments; and an electrolyte between the cathode and the anode.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
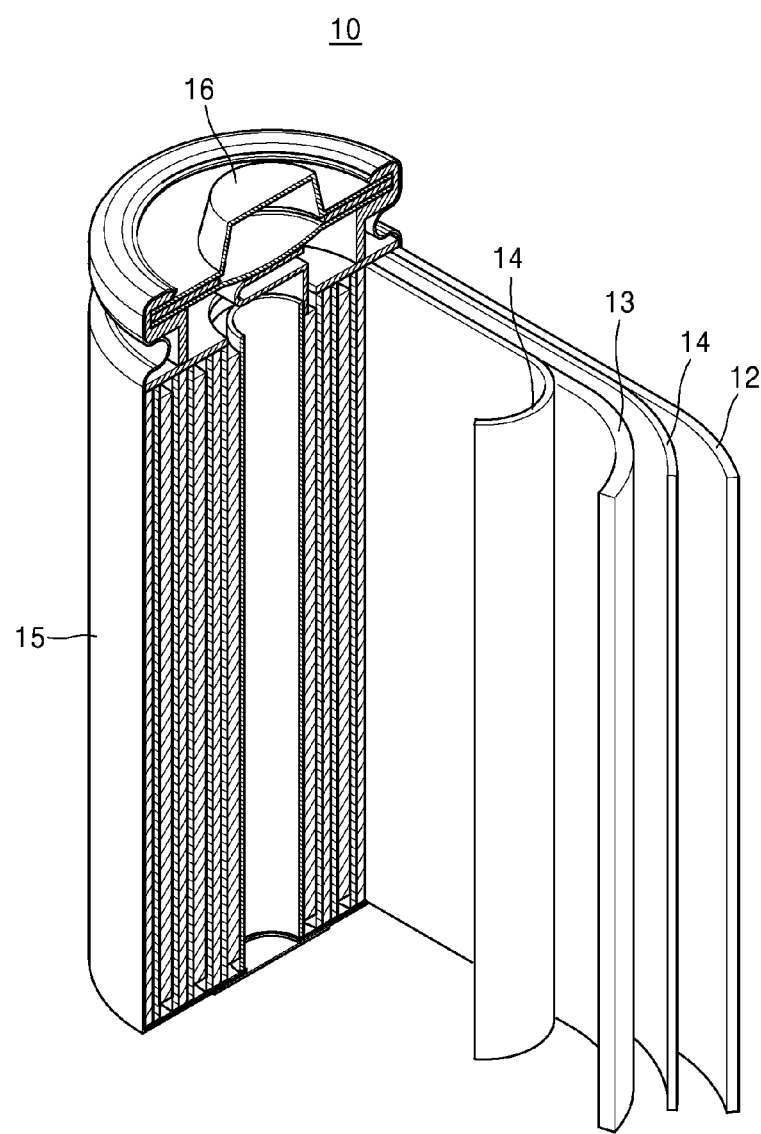
FIG. 1 is a schematic view illustrating a structure of a lithium secondary battery according to an embodiment of the present disclosure.

Reference will now be made in more detail to embodiments, examples of which are illustrated in the accompanying drawings, wherein like reference numerals refer to like elements throughout and duplicative descriptions thereof may not be provided. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," and "one of,"

when preceding a list of elements, modify the entire list of elements and do not modify the individual elements of the list.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Hereinafter, example embodiments of an anode active material for a lithium secondary battery, a lithium secondary battery including an anode including the anode active material, and a method of manufacturing the lithium secondary battery will be described in greater detail.

According to one or more aspects of embodiments of the present disclosure, an anode active material for a lithium secondary battery includes a first composite including at least two active silicon materials having different crystal sizes and a silicon oxide ($SiO_x$) material (wherein $0<x\le2$).

In one or more embodiments, the first composite may contain, for example, a large-particle diameter active silicon material and a small-particle diameter active silicon material. As used herein, the term "large-particle diameter active silicon material" may refer to an active silicon material having a relatively large crystal size, and the term "small-particle diameter active silicon material" may refer to an active silicon material having a relatively small crystal size as compared to the large-particle diameter active silicon material.

Silicon materials have good capacity characteristics, but unsatisfactory lifetime characteristics. Accordingly, further improvement is required in this regard. In addition, silicon oxides have low initial efficiency.

To address these drawbacks, the present disclosure provides an anode active material including an active silicon material and a silicon oxide ($SiO_x$) material (wherein $0<x\le2$) including inactive silicon. The active silicon may reversibly react with lithium ions (e.g., intercalate/deintercalate or dope/de-dope lithium ions) and is directly related to (e.g., may provide for) the capacity of the anode active material. The inactive silicon may form an inactive silicon matrix that does not react with lithium ions, and thus may suppress volume expansion of the anode active material.

In the anode active material of the present disclosure, the active silicon material is dispersed in a silicon oxide ($SiO_x$) matrix (wherein $0<x\le2$) including the inactive silicon. The anode active material may include the active silicon material having an increased (e.g., relatively large) crystal size. The lithium secondary battery including an anode using the anode active material may have improved initial efficiency and capacity. The capacity of the lithium secondary battery may gradually increase due to reaction of the active material with lithium as charging and discharging is repeated. The silicon oxide material in the anode active material may be a crystalline silicon oxide material. The at least two active silicon materials having different crystal sizes may include, for example, a mixture or combination of a large-particle diameter active silicon material and a small-particle diameter active silicon material.

When an anode active material includes only a large-particle diameter active silicon material, onset of capacity characteristics of the anode active material (e.g., the increase in capacity with cycling) may be delayed, resulting in insufficient initial efficiency. Accordingly, an improvement is required in this regard. However, as the anode active material according to an embodiment of the present disclosure includes the at least two active silicon materials having different crystal sizes, for example, a large-particle diameter active silicon material and a small-particle diameter active silicon material, the anode active material may have increased capacity and improved lifetime due to reaction with lithium as charging and discharging is repeated. A compensation anode may be manufactured using this anode active material.

The large-particle diameter active silicon material may have a crystal size of about 24 nm to about 40 nm, for example, about 25 nm to about 35 nm. The small-particle diameter active silicon material may have a crystal size of about 8 nm to about 12 nm, for example, about 9 nm to about 10 nm.

An amount of the small-particle diameter active silicon material may be about 20 wt % to about 80 wt % based on a total (e.g., combined) weight (100 wt %) of the large-particle diameter active silicon material and the small-particle diameter active silicon material. When the amount of the small-particle diameter active silicon material is within this range, an anode having improved initial efficiency may be manufactured.

In the first composite including the at least two active silicon materials having different crystal sizes and the silicon oxide ($SiO_x$) material (wherein $0<x\le2$), a total (e.g., combined) amount of the at least two active silicon materials having different crystal sizes may be about 25 wt % to about 50 wt % based on a total (e.g., combined) weight (100 wt %) of the at least two active silicon materials having different crystal sizes with the silicon oxide material. When the amount of the at least two active silicon materials having different crystal sizes is within this range, a lithium secondary battery having improved discharge capacity and good lifetime characteristics may be manufactured.

As used herein, the term "crystal size" may refer to an average particle diameter of active silicon crystals when the active silicon material is in the form of spherical particles, or may refer to a length of a major axis of active silicon crystals when the active silicon material is not in a spherical form, for example, in the form of non-spherical particles.

In some embodiments, the crystal size in the anode active material may be measured using any suitable method available to one of ordinary skill in the art. For example, the crystal size may be calculated based on a full width at half maximum (FWHM) of a peak at a $2\theta$ of about $28.5°$ as obtained by X-ray diffraction analysis.

As used herein, the term "average particle diameter" may correspond to "D50", which refers to the 50th percentile particle size in the cumulative distribution of total particles accumulated from smallest to largest in size (ascending order), wherein a total number of the accumulated particles is taken to be 100%. The average particle diameter may be measured and determined using any suitable method available to one of ordinary skill in the art, for example, using a particle size analyzer, transmission electron microscopy (TEM) imaging, or scanning electron microscopy (SEM) imaging. As another method, the average particle diameter may be measured using a dynamic light scattering instrument, wherein the number of particles in a certain range of sizes may be counted using dynamic light scattering, and the average particle diameter may be calculated from the counted number of the particles.

According to another aspect of embodiments of the present disclosure, an anode active material for a lithium secondary battery includes: a second composite comprising an active silicon material having a crystal size of about 24 nm or greater and a silicon oxide ($SiO_x$) (wherein $0<x\leq2$); and a carbonaceous material.

The carbonaceous material may be any suitable material available in the art. For example, the carbonaceous material may be at least one selected from graphite, carbon black, graphite, carbon nanotubes, carbon nanofibers, graphene, pitch, and vacuum-grown carbon fibers.

The second composite of the anode active material may have good capacity characteristics (e.g., high capacity) but may exhibit a delayed onset of capacity (e.g., a decreased initial capacity), and thus initial efficiency may be unsatisfactory. Furthermore, when the active silicon material has large crystals, the anode active material may have increased resistance, which can inhibit diffusion of lithium and delay capacity onset (e.g., delay utilization of the full capacity) of the anode active material. Accordingly, when the carbonaceous material described above is included in the second composite, a lithium secondary battery having improved initial efficiency and good discharge capacity may be manufactured.

The active silicon material in the second composite may have a crystal size of about 24 nm or greater, for example, about 24 nm to about 40 nm. A total (e.g., full or final) amount of the active silicon material having a crystal size of about 24 nm or greater in the second composite may be about 3 wt % to about 25 wt %, and the amount of the carbonaceous material may be about 75 wt % to about 97 wt % (e.g., based on a total (combined) weight of the second composite with the carbonaceous material). When the amount of the active silicon having a crystal size of about 24 nm or greater is within this range, a lithium secondary battery having good discharge capacity and lifetime characteristics may be manufactured.

According to another aspect of the present disclosure, an anode active material for a lithium secondary battery includes: i) a first composite including at least two active silicon materials having different crystal sizes and a silicon oxide ($SiO_x$) (wherein $0<x\leq2$); and ii) a second composite including an active silicon material having a crystal size of about 24 nm or greater and a silicon oxide ($SiO_x$) (wherein $0<x\leq2$), and a carbonaceous material (e.g., a second composite mixed with a carbonaceous material).

An amount of the first composite in the anode active material may be about 30 wt % to about 50 wt % based on a total (e.g., combined) weight of the anode active material. When the amount of the first composite is within this range, a lithium secondary battery having good initial efficiency, discharge capacity, and lifetime characteristics may be manufactured using the anode active material.

In some embodiments, the anode active material may have a D90 of about 10 μm to about 12 μm and a D10 of about 3 μm to about 5 μm.

As used herein, the terms "D90" and "D10" may refer to the particle sizes of the 90th and 10th percentiles, respectively, in the cumulative distribution of total particles. The term "D95" may refer to a particle size at 95th percentile in the cumulative distribution of the particles. These particle sizes of the anode active material may be measured using any suitable method available to one of ordinary skill in the art.

A method of preparing an anode active material according to an embodiment of the present disclosure will now be described.

First, a method of preparing an anode active material including a first composite including at least two active silicon materials having different crystal sizes and a silicon oxide ($SiO_x$) material (wherein $0<x\leq2$) will be described.

An amorphous silicon oxide ($SiO_x$) material (wherein $0<x\leq2$) and an amorphous silicon material may be mixed together to obtain a composition for forming an anode active material. The amorphous silicon oxide may have an average particle diameter of about 5 μm to about 7 μm, and the amorphous silicon material may have an average particle diameter of about 5 μm to about 15 μm.

The composition for forming an anode active material may be thermally treated at a temperature in a range of about 1000° C. to about 1500° C., for example, about 1100° C. to about 1300° C. The thermal treatment may be performed under an inert gas atmosphere to obtain the anode active material including the first composite. The inert gas atmosphere may be created using an inert gas (such as argon (Ar), nitrogen ($N_2$), helium (He), and/or the like).

As the thermal treatment temperature of the composition for forming an anode active material is increased, the crystal size of the silicon material in the anode active material may be increased, and the amorphous silicon oxide and the amorphous silicon may be changed into crystalline silicon oxide and crystalline silicon, respectively.

A second composite including a large-particle diameter active silicon material having a crystal size of about 24 nm or greater and an amorphous silicon oxide ($SiO_x$) (wherein $0<x\leq2$) may be prepared in the same manner as the first composite described above, except that the thermal treatment may be performed in a temperature range of about 1400° C. to about 1500° C.

A composite including a small-particle diameter active silicon material having a crystal size of about 8 nm to about 12 nm and an amorphous silicon oxide material may be prepared in the same manner as the first composite described above, except that the thermal treatment may be performed at a temperature of about 1100° C. to about 1200° C.

According to one or more embodiments of the present disclosure, a first composite including a large-particle diameter active silicon material having a crystal size of about 24 nm or greater, a small-particle diameter active silicon material having a crystal size of about 8 nm to about 12 nm, and an amorphous silicon oxide ($SiO_x$) material (wherein $0<x\leq2$) may be prepared by mixing i) the composite including the large-particle diameter active silicon material and the amorphous silicon oxide ($SiO_x$) material (wherein $0<x\leq2$), prepared as described above, and ii) the composite including the small-particle diameter active silicon material and the amorphous silicon oxide ($SiO_x$) material (wherein $0<x\leq2$), prepared as described above, in a predetermined ratio.

In some embodiments, an anode active material including a first composite including a large-particle diameter active silicon material having a crystal size of about 24 nm or greater, a small-particle diameter active silicon material having a crystal size of about 8 nm to about 12 nm, and an amorphous silicon oxide ($SiO_x$) material (wherein $0<x\leq2$), may be obtained through a single thermal treatment process.

In some embodiments, an anode active material including: a second composite including a large-particle diameter active silicon material having a crystal size of about 24 nm or greater and a silicon oxide ($SiO_x$) material (wherein $0<x\leq2$); and a carbonaceous material, may be prepared by obtaining the second composite including the large-particle diameter active silicon material having a crystal size of about 24 nm or greater and the silicon oxide ($SiO_x$) material (wherein $0<x\leq2$) according to an above-described process, and subsequently adding a carbonaceous material to the second composite in a predetermined ratio and mixing them together.

In some embodiments, an anode active material including: i) a first composite including at least two active silicon materials having different crystal sizes and a silicon oxide ($SiO_x$) material (wherein 0<x≤2); and ii) a second composite including an active silicon material having a crystal size of about 24 nm or greater and a silicon oxide ($SiO_x$) material (wherein 0<x≤2), and a carbonaceous material, may be prepared by obtaining a mixture or combination of the second composite prepared according to an above-described method with the carbonaceous material, and mixing or combining said mixture or combination with the first composite prepared according to an above-described method.

Hereinafter, a method of manufacturing an anode using an anode active material according to any of the above-described embodiments, and a method of manufacturing a lithium second battery including this anode will now be described.

An anode active material according to any of the above-described embodiments, a conducting agent, a binder, and a solvent may be mixed to prepare a composition for forming an anode active material film. This composition may be directly coated on a copper current collector to form an anode active material film, thereby manufacturing an anode including the anode active material film.

In some embodiments, the composition for forming an anode active material film may be cast on a separate support to form an anode active material film. This anode active material film may then be separated from the support and laminated on a copper current collector, thereby manufacturing an anode.

In some embodiments, in addition to an anode active material according to any of the above-described embodiments, another anode active material available in the art may be used. This other anode active material may be any suitable anode active material for a lithium secondary battery available in the art. For example, the common anode active material may include at least one selected from the group consisting of lithium metal, a metal alloyable with lithium, a transition metal oxide, a non-transition metal oxide, and a carbonaceous material. For example, the metal alloyable with lithium may be silicon (Si), tin (Sn), aluminum (Al), germanium (Ge), lead (Pb), bismuth (Bi), antimony (Sb), a Si-Y alloy (wherein Y may be an alkali metal, an alkali earth metal, a Group 13 to Group 16 element excluding Si, a transition metal, a rare earth element, or a combination thereof), a Sn-Y alloy (wherein Y may be an alkali metal, an alkali earth metal, a Group 13 to Group 16 element excluding Sn, a transition metal, a rare earth element, or a combination thereof), or the like. In the Si-Y alloy and the Sn-Y alloy, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or any combination thereof. For example, the transition metal oxide may be a lithium titanium oxide, a vanadium oxide, or a lithium vanadium oxide. For example, the non-transition metal oxide may be $SnO_2$ or $SiO_x$ (wherein 0<x<2).

The conducting agent may be a carbonaceous material such as carbon black, graphite particulates, natural graphite, artificial graphite, acetylene black, Ketjenblack, or carbon fibers; carbon nanotubes; a metal powder, metal fibers, or metal tubes of copper, nickel, aluminum, or silver; or a conducting polymer such as a polyphenylene derivative. However, embodiments of the present disclosure are not limited thereto. Any suitable conducting agent available in the art may be used.

The binder may be, for example, a vinylidene fluoride/hexafluoropropylene copolymer, polyvinylidene fluoride (PVDF), polyacrylonitrile, polymethyl methacrylate, polytetrafluoroethylene (PTFE), any mixture or combination thereof, or a styrene-butadiene rubber polymer. However, embodiments of the present disclosure are not limited thereto. Any material available as a binding agent in the art may be used. For example, the solvent may be N-methyl-pyrrolidone (NMP), acetone, and/or water. However, embodiments of the present disclosure are not limited thereto. Any suitable solvent available in the art may be used.

The amounts of the anode active material, the conducting agent, the binder, and the solvent may be the same as those generally used in the art for lithium secondary batteries. At least one of the conducting agent, the binder, and the solvent may be omitted depending on the use and structure of the lithium secondary battery. For applications in other types or kinds of electrochemical cells such as supercapacitors (e.g., other than lithium secondary batteries), the method of manufacturing the anode and the composition and the structure of the anode may be appropriately varied. For example, an anode for a capacitor may be manufactured by disposing a metal structure on a conductive substrate, and coating a composition for forming an anode active material according to an embodiment described above on the metal structure. In some embodiments, an anode for a capacitor may be manufactured by directly coating the above-described anode active material composition on a conductive substrate.

A cathode including a cathode active material may be manufactured as follows.

First, a cathode active material, a conducting agent, a binder, and a solvent may be mixed to prepare a composition for forming a cathode active material. The composition for forming a cathode active material may be directly coated on an current collector and dried to form a cathode including a cathode active material film. In some embodiments, a cathode active material film forming composition may be cast on a separate support to form a cathode active material film. This cathode active material film may then be separated from the support and laminated on an aluminum current collector to thereby manufacture a cathode including the cathode active material film. In some embodiments, the cathode active material may further include a common cathode active material. The common cathode active material may be any cathode active material available in the art, for example, a lithium-containing metal oxide. For example, the common cathode active material may be at least one of a lithium composite oxide with a metal selected from among cobalt, manganese, nickel, and a combination thereof. The lithium-containing metal oxide may be a compound represented by one of the following formulae: $Li_aA_{1-b}B^1{}_bD^1{}_2$ (wherein 0.90≤a≤1.8, and 0≤b≤0.5); $Li_aE_{1-b}B^1{}_bO_{2-c}D^1{}_c$ (wherein 0.90≤a≤1.8, 0≤b≤0.5, and 0≤c≤0.05); $LiE_{2-b}B^1{}_bO_{4-c}D^1{}_c$ (wherein 0≤b≤0.5, and 0≤c≤0.05); $Li_aNi_{1-b-c}$ $Co_bB^1_cD^1_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB^1_cO_{2-\alpha}F^1_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB^1_cO_{2-\alpha}F^1_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1_cD^1_\alpha$ (wherein $0.90 \leq a \leq 1.8$, $0 \leq b \leq 0.5$, $0 \leq c \leq 0.05$, and $0 \leq \alpha 2$); $Li_aNi_{1-b-c}Mn_bB^1_cO_{2-\alpha}F^1_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1_cO_{2-\alpha}F^1_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.80$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aM_{n2}G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'_1O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be selected from the group consisting of nickel (Ni), cobalt (Co), manganese (Mn), and combinations thereof; $B^1$ may be selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from the group consisting of oxygen (O), fluorine (F), sulfur (S), phosphorus (P), and combinations thereof; E may be selected from the group consisting of cobalt (Co), manganese (Mn), and combinations thereof; F' may be selected from the group consisting of fluorine (F), sulfur (S), phosphorus (P), and combinations thereof; G may be selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q may be selected from the group consisting of titanium (Ti), molybdenum (Mo), manganese (Mn), and combinations thereof; I' may be selected from the group consisting of chromium (Cr), vanadium (V), iron (Fe), scandium (Sc), yttrium (Y), and combinations thereof; and J may be selected from the group consisting of vanadium (V), chromium (Cr), manganese (Mn), cobalt (Co), nickel (Ni), copper (Cu), and combinations thereof. For example, the lithium-containing metal oxide may be $LiCoO_2$, $LiMn_xO_{2x}$ (wherein x=1 or 2), $LiNi_{1-x}Mn_xO_{2x}$ (wherein $0 < x < 1$), $Ni_{1-x-y}Co_xMn_yO_2$ (wherein $0 \leq x \leq 0.5$, and $0 \leq y \leq 0.5$), or $LiFePO_4$.

In some embodiments, the compounds listed above as cathode active materials may have a surface coating layer (hereinafter, "coating layer"). In some embodiments, a mixture or combination of a compound without a coating layer and a compound having a coating layer, the compounds being selected from the compounds listed above, may be used. The coating layer may include at least one coating element compound selected from the group consisting of an oxide, a hydroxide, an oxyhydroxide, an oxycarbonate, and a hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture or combination thereof. The coating layer may be formed using any method that does not adversely affect the physical properties of the cathode active material when a compound of the coating element is used. For example, the coating layer may be formed using a spray coating method, a dipping method, and/or the like. This will be understood by those of ordinary skill in the art, and thus a detailed description thereof is not provided.

The conducting agent, the binder, and the solvent which may be used in the composition for forming a cathode active material film may each be the same as those used in the anode. The amounts of the cathode active material, the conducting agent, the binder, and the solvent may be the same as those generally used in the art for lithium secondary batteries.

According to another aspect of the present disclosure, a lithium secondary battery may be manufactured as follows. After a cathode and an anode are manufactured as described in the above embodiments, a separator to be positioned between the cathode and the anode may be prepared.

The separator may be any suitable separator available in the art for lithium secondary batteries. The separator may have low resistance against migration of electrolyte ions and have a good electrolyte-retaining ability. Non-limiting examples of the separator may include glass fiber, polyester, Teflon, polyethylene, polypropylene, polytetrafluoroethylene (PTFE), and a combination thereof, each of which may be in the form of a non-woven or woven fabric. For example, a rollable separator including polyethylene or polypropylene may be used in a lithium ion battery. A separator with a good organic electrolyte solution-retaining ability may be used in a lithium ion polymer battery. For example, the separator may be manufactured in the following manner.

A polymer resin, a filler, and a solvent may be mixed together to prepare a separator composition. The separator composition may be directly coated on an electrode and then dried to form the separator. In some embodiments, the separator composition may be cast on a support and then dried to form a separator film. This separator film may then be separated from the support and laminated on an electrode to form the separator.

The polymer resin used to manufacture the separator may be any material suitably used as a binder for electrode plates. Non-limiting examples of the polymer resin may include a vinylidenefluoride/hexafluoropropylene copolymer, polyvinylidene fluoride (PVDF), polyacrylonitrile, polymethylmethacrylate, and a mixture or combination thereof.

Next, an electrolyte is prepared.

In some embodiments, the electrolyte may be an organic electrolyte solution. In some embodiments, the electrolyte may be in a solid phase (e.g., a solid phase electrolyte). Non-limiting examples of the electrolyte may include boron oxide and lithium oxynitride. Any suitable material available as a solid electrolyte in the art may be used. The solid electrolyte may be formed on the anode by, for example, sputtering.

In some embodiments, the organic electrolyte solution may be prepared by dissolving a lithium salt in an organic solvent.

The organic solvent may be any suitable organic solvent available in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl-1,3-dioxolane, N,N-dimethyl formamide, N,N-dimethyl acetamide, N,N-dimethylsulfoxide, 1,4-dioxane, 1,2-dimethoxyethane, sulfolane, dichloroethane, chlorobenzene, nitrobenzene, diethylene glycol, dimethyl ether, or any mixture or combination thereof.

The lithium salt may be any lithium salt available in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may be natural numbers), LiCl, LiI, or a mixture or combination thereof.

Referring to FIG. 1, a lithium secondary battery 11 according to an embodiment of the present disclosure may include a cathode 13, an anode 12, and a separator 14. The cathode 13, the anode 12, and the separator 14 may be wound or folded, and then sealed in a battery case 15. Then, the battery case 15 may be filled with an organic electrolyte solution and sealed with a cap assembly 16, thereby completing the manufacture of the lithium secondary battery 11. The battery case 15 may have a cylindrical shape, a rectangular shape, or a thin-film shape. For example, the lithium secondary battery 11 may be a thin-film battery. The lithium secondary battery 11 may be a lithium ion battery.

In some embodiments, the separator may be positioned between the positive electrode and the negative electrode to form a battery assembly. In some embodiments, the battery assembly may be stacked in a bi-cell structure and impregnated with the organic electrolyte solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smartphone, or an electric vehicle.

The lithium secondary battery may have improved lifetime characteristics and high rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

One or more embodiments of the present disclosure will now be described in more detail with reference to the following examples. However, these examples are provided only for illustrative purposes, and are not intended to limit the scope of the one or more embodiments of the present disclosure.

EXAMPLE 1

Preparation of Anode Active Material

An amorphous silicon oxide ($SiO_x$) material (wherein $0<X\leq2$) having an average particle diameter of about 5 μm and an amorphous silicon (Si) material having an average particle diameter of about 5 μm were mixed to prepare a composition for forming an anode active material film. The amount of the amorphous silicon oxide material was about 97 wt %, and the amount of the amorphous silicon material was about 3 wt %.

The composition for forming an anode active material film was thermally treated under a nitrogen atmosphere at about 1300° C. for about 10 hours to obtain an anode active material in which a crystalline large-particle diameter active silicon material having a crystal size of about 24 nm and a crystalline small-particle diameter active silicon material having a crystal size of about 10 nm were dispersed in a ratio of about 7:3 by weight in crystalline silicon oxide ($SiO_x$) (wherein $0<X\leq2$).

EXAMPLE 2

Preparation of Anode Active Material

An anode active material was prepared in the same manner as in Example 1, except that the thermal treatment time was changed to about 7 hours. The crystalline large-particle diameter active silicon material having a crystal size of about 24 nm and the crystalline small-particle diameter active silicon material having a crystal size of about 10 nm were uniformly dispersed in a ratio of about 5:5 by weight in the crystalline silicon oxide ($SiO_x$) (wherein $0<X\leq2$).

EXAMPLE 3

Preparation of Anode Active Material

An anode active material was prepared in the same manner as in Example 1, except that the thermal treatment time was changed to about 4 hours. The crystalline large-particle diameter active silicon material having a crystal size of about 24 nm and the crystalline small-particle diameter active silicon material having a crystal size of about 10 nm were uniformly dispersed in a ratio of about 3:7 by weight in the crystalline silicon oxide ($SiO_x$) (wherein $0<X\leq2$).

EXAMPLE 4

Preparation of Anode Active Material

An anode active material was prepared by mixing graphite and the anode active material of Example 1 in a ratio of about 95:5 by weight.

EXAMPLE 5

Preparation of anode active material

An anode active material was prepared in the same manner as in Example 4, except that the mixing ratio of graphite to the anode active material was changed to about 90:10 by weight.

EXAMPLE 6

Preparation of Anode Active Material

An anode active material was prepared in the same manner as in Example 4, except that the mixing ratio of graphite to the anode active material was changed to about 85:15 by weight.

EXAMPLE 7

Preparation of Anode Active Material

An anode active material was prepared in the same manner as in Example 4, except that the mixing ratio of graphite to the anode active material was changed to about 80:20 by weight.

EXAMPLE 8

Preparation of Anode Active Material

An anode active material was prepared in the same manner as in Example 4, except that the mixing ratio of graphite to the anode active material was changed to about 75:25 by weight.

EXAMPLE 9

Preparation of Anode Active Material

An anode active material was prepared in the same manner as in Example 4, except that the mixing ratio of graphite to the anode active material was changed to about 97:3 by weight.

EXAMPLE 10 to 13

Preparation of Anode Active Material

Anode active materials were prepared in the same manner as in Example 1, except that the thermal treatment of the composition for forming an anode active material film was performed under a nitrogen atmosphere at 1100° C., about 1150° C., about 1200° C., and about 1250° C., respectively, for about 10 hours.

Comparative Example 1

Preparation of Anode Active Material

An anode active material was prepared by simply blending an amorphous silicon oxide ($SiO_x$) material (wherein $0<X\leq2$) having an average particle diameter of about 5 μm and a silicon (Si) material having an average particle diameter of about 5 μm.

Comparative Example 2

Preparation of anode active material

An anode active material was prepared by simply blending the anode active material of Comparative Example 1 and graphite in a ratio of about 5:95 by weight.

Comparative Example 3

Preparation of Anode Active Material

An anode active material was prepared by blending silicon having a crystal size of about 25 nm with an amorphous silicon oxide ($SiO_x$) material (wherein $0<X\leq2$) having an average particle diameter of about 5 μm.

Manufacture Example 1

Manufacture of Anode and Coin Cell 10 g of the anode active material prepared in Example 1, 1 g of a carbon conducting agent (Super-P, Timcal Inc.), and 3 g of a binder (polyamide/imide, PAI) were mixed together with 15 mL of N-methylpyrrolidone (NMP) in a mortar to prepare a composition for forming an anode active material film in slurry form. This slurry was coated on a copper current collector to a thickness of about 100 m using a doctor blade, and dried at room temperature (about 25° C.) for about 2 hours ($1^{st}$ drying). Subsequently, the dried product was further dried in a vacuum at about 350° C. for about 1 hour ($2^{nd}$ drying) to manufacture an anode.

While a polypropylene separator (Celgard 3510) was disposed between the anode and a lithium metal used as a counter electrode, a solution of 1.3 M $LiPF_6$ dissolved in a mixture of ethylene carbonate (EC) and diethyl carbonate (DEC) (in a ratio of about 3:7 by weight) was injected as an electrolyte, thereby manufacturing a CR-2016 standard coin cell.

Manufacture Examples 2 to 9

Manufacture of Anode and Coin Cell

Coin cells were manufactured in the same manner as in Manufacture Example 1, except that the anode active materials prepared in Examples 2 to 9 were used, respectively, in place of the anode active material of Example 1.

Comparative Manufacture Examples 1 to 3

Manufacture of Anode and Coin Cell

Coin cells were manufactured in the same manner as in Manufacture Example 1, except that the anode active materials prepared in Comparative Examples 1 to 3 were used, respectively, in place of the anode active material of Example 1.

Evaluation Example 1

Scanning Electron Microscopy (SEM)

The anode active materials prepared in Examples 1 to 3 were analyzed by scanning electron microscopy (SEM). The SEM results of the anode active materials of Examples 1 to 3 are shown in FIGS. 2 to 4, respectively.

Figure 2:
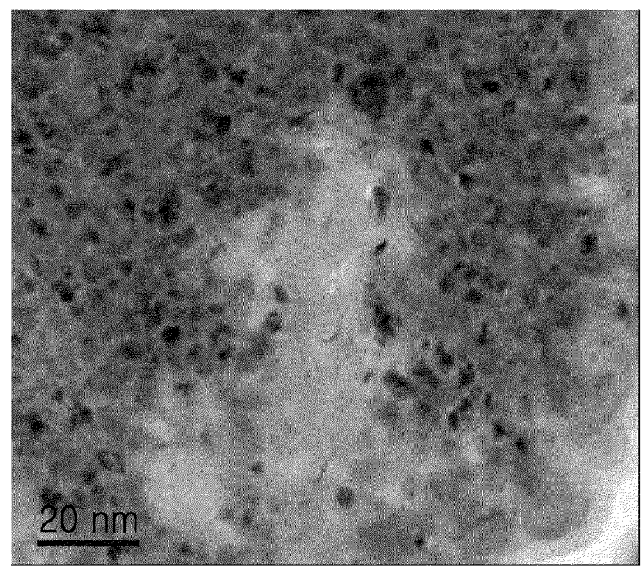
FIGS. 2 to 4 are scanning electron microscopy (SEM) images of the anode active materials of Examples 1 to 3, respectively.
Figure 3:
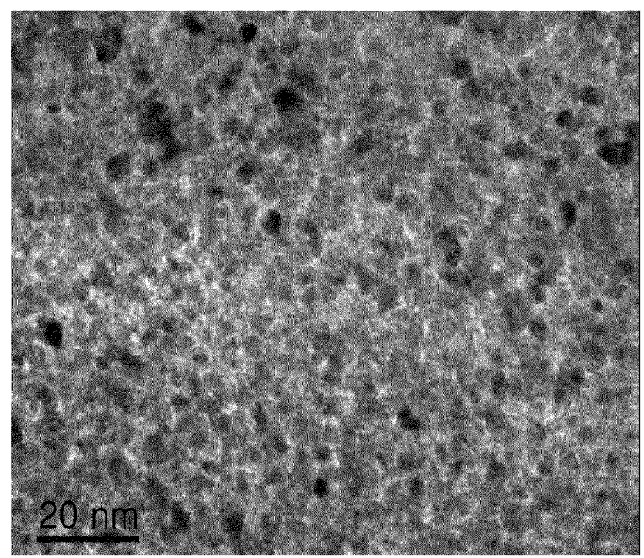
Figure 4:
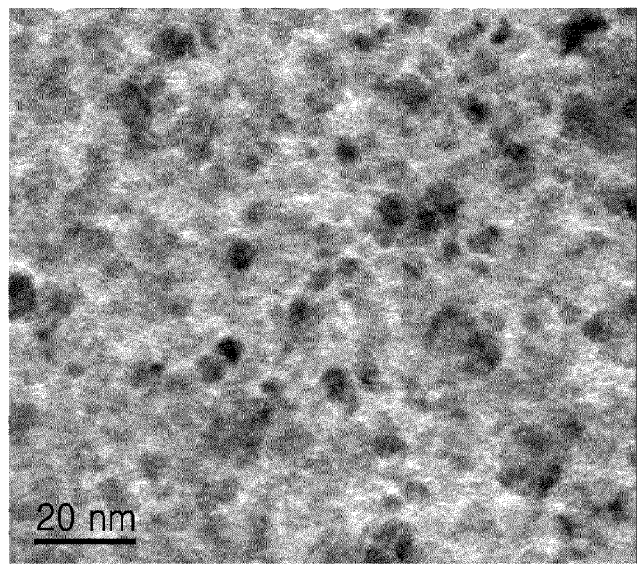

Referring to FIGS. 2 to 4, it was found that the shorter the thermal treatment time of the composition for forming an anode active material film, the less a relative amount of the crystalline large-particle diameter active silicon having a crystal size of about 24 nm became (e.g., the smaller the proportion of crystalline large-particle diameter active silicon having a crystal size of about 24 nm).

Evaluation Example 2

Charge-Discharge Characteristics (Discharge Capacity)

1) Manufacture Examples 1 to 3 and Comparative Manufacture Example 1

Figure 5:
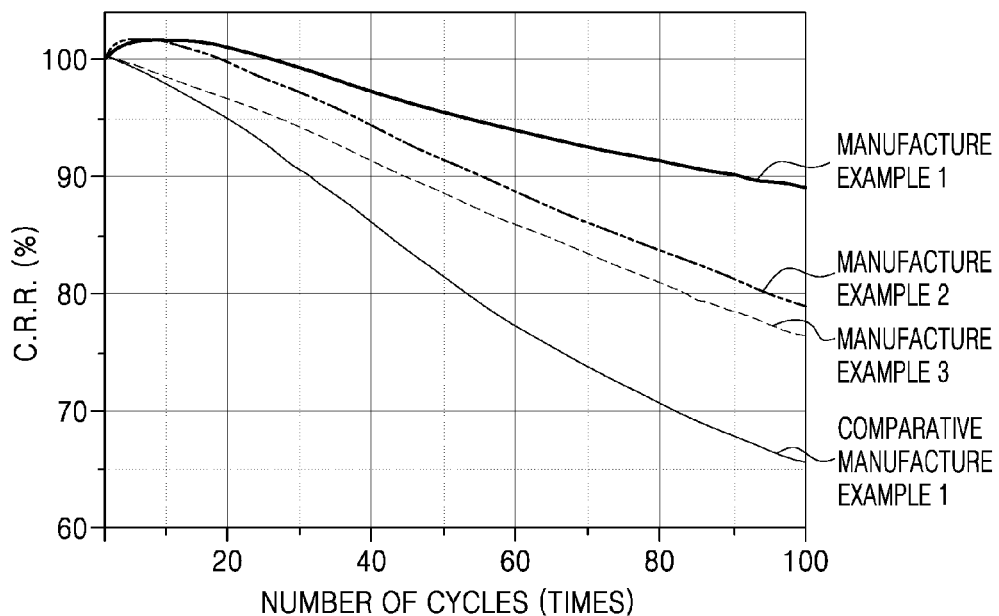
FIG. 5 is a graph illustrating the lifetime characteristics of coin cells of Manufacture Examples 1 to 3 and Comparative Manufacture Example 1.

The coin cells manufactured in Manufacture Examples 1 to 3 and Comparative Manufacture Example 1 were each charged with a constant current of about 100 mA per 1 g of the anode active material to reach about 0.001 V with respect to the Li electrode (e.g., $Li^+/Li$), and then charged with a constant voltage of 0.001 V until the current was reduced to about 10 mA per 1 g of the active material. Each fully charged coin cell was subjected to a rest period for about 10 minutes, and then charged with a constant current of about 100 mA per 1 g of the active material until the voltage reached about 1.5 V. The resulting charge-discharge characteristics are shown in FIG. 5. In FIG. 5, C.R.R. stands for capacity retention rate (lifetime characteristics).

Referring to FIG. 5, the coin cells manufactured in Manufacture Examples 1 to 3 were found to have improved lifetime characteristics, as compared to the coin cell of Comparative Manufacture Example 1. The coin cell of Manufacture Example 1 was found to have the best lifetime characteristics among the other coin cells.

2) Manufacture Examples 4 to 8 and Comparative Manufacture Example 2

Lifetime characteristics of the coin cells manufactured in Manufacture Examples 4 to 8 and Comparative Manufacture Example 2 were evaluated in the same manner as that applied to the coin cells of Manufacture Examples 1 to 3 and Comparative Manufacture Example 1. The lifetime characteristic evaluation results are shown in FIG. 6.

Figure 6:
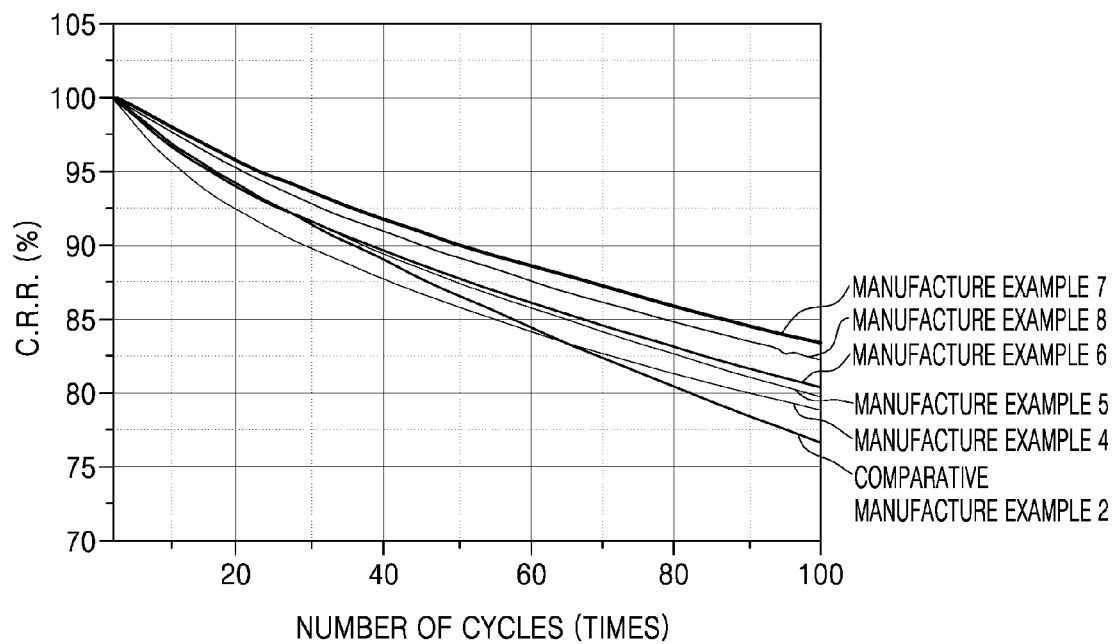
FIG. 6 is a graph illustrating the lifetime characteristics of coin cells of Manufacture Examples 4 to 8 and Comparative Manufacture Example 2.

Referring to FIG. 6, the coin cells manufactured in Manufacture Examples 4 to 8 were found to have improved lifetime characteristics, compared with the coin cell of Comparative Manufacture Example 2. The coin cell of Manufacture Example 7 was found to have the best lifetime characteristics among the other coin cells.

3) Manufacture Examples 4 and 9 and Comparative Manufacture Example 3

Lifetime characteristics of the coin cells manufactured in Manufacture Examples 4 and 9 and Comparative Manufacture Example 3 were evaluated in the same manner as that applied to the coin cells of Manufacture Examples 1 to 3 and Comparative Manufacture Example 1. The lifetime characteristic evaluation results are shown in FIGS. 13 and 14.

Figure 13:
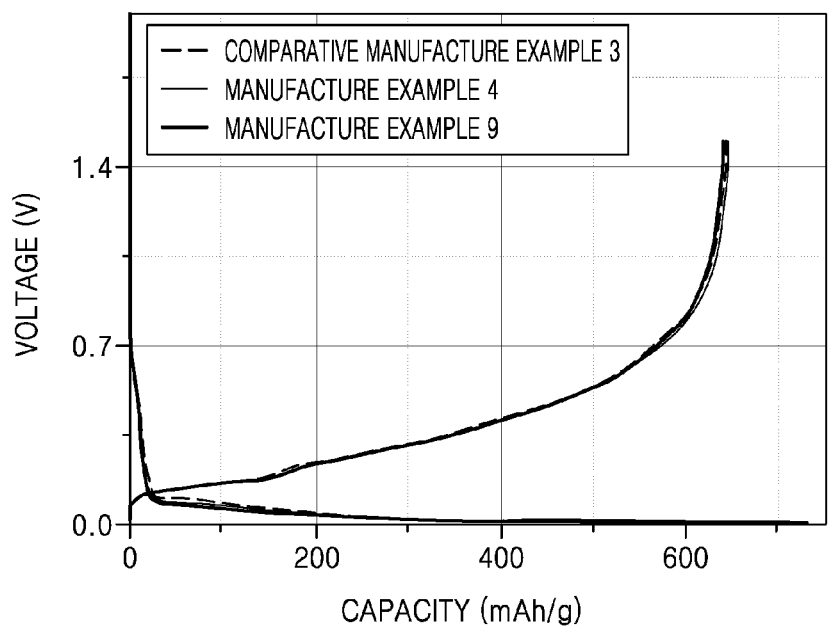
FIG. 13 is a graph of voltage with respect to capacity in the coin cells of Manufacture Examples 4 and 9 and Comparative Manufacture Example 3.

FIG. 13 is a graph of voltage with respect to capacity in the coin cells of Manufacture Examples 4 and 9 and Comparative Manufacture Example 3. FIG. 4 is a graph illustrating lifetime characteristics in the coin cells of Manufacture Examples 4 and 9 and Comparative Manufacture Example 3. In FIG. 14, C.R.R. stands for capacity retention rate (lifetime characteristics).

Referring to FIG. 13, the coin cells manufactured in Manufacture Examples 4 and 9 and the coin cell of Comparative Manufacture Example 3 were found to have similar initial characteristics.

Figure 14:
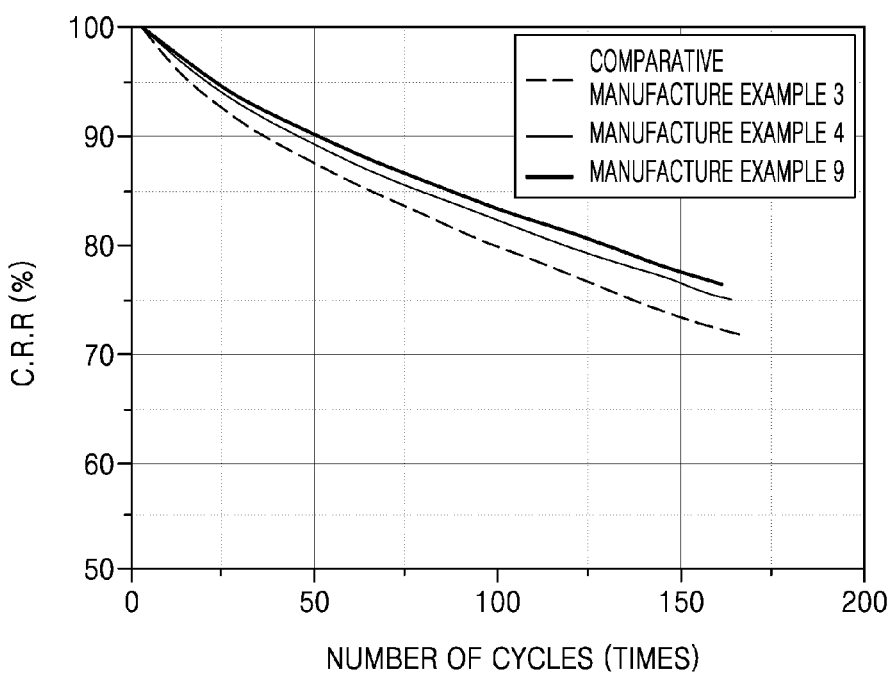
FIG. 14 is a graph illustrating lifetime characteristics of the coin cells of Manufacture Examples 4 and 9 and Comparative Manufacture Example 3.

Referring to FIG. 14, the coin cells manufactured in Manufacture Examples 4 and 9 were found to have improved lifetime characteristics, as compared to the coin cell of Comparative Manufacture Example 3.

Evaluation Example 4

Transmission Electron Microscopy (TEM)

Figure 7A:
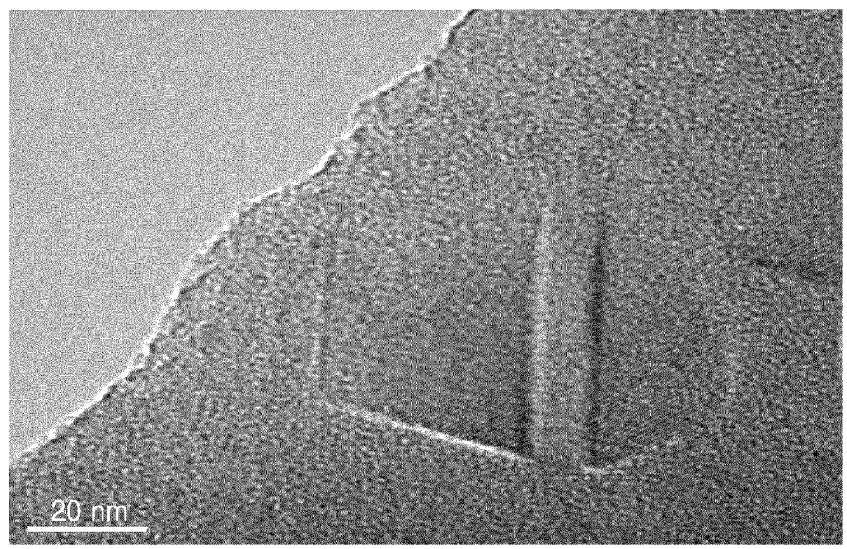
FIGS. 7A and 7B are transmission electron microscopy (TEM) images of the anode active material of Example 1.
Figure 7B:
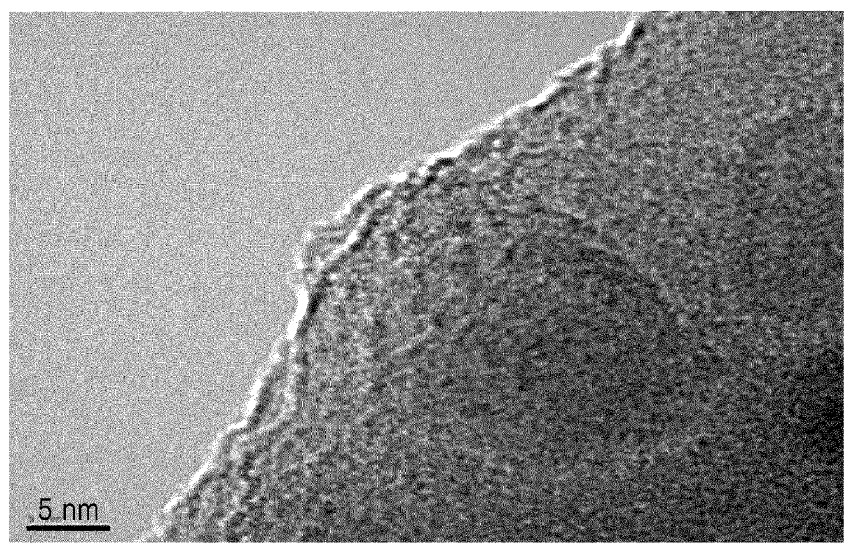
Figure 8A:
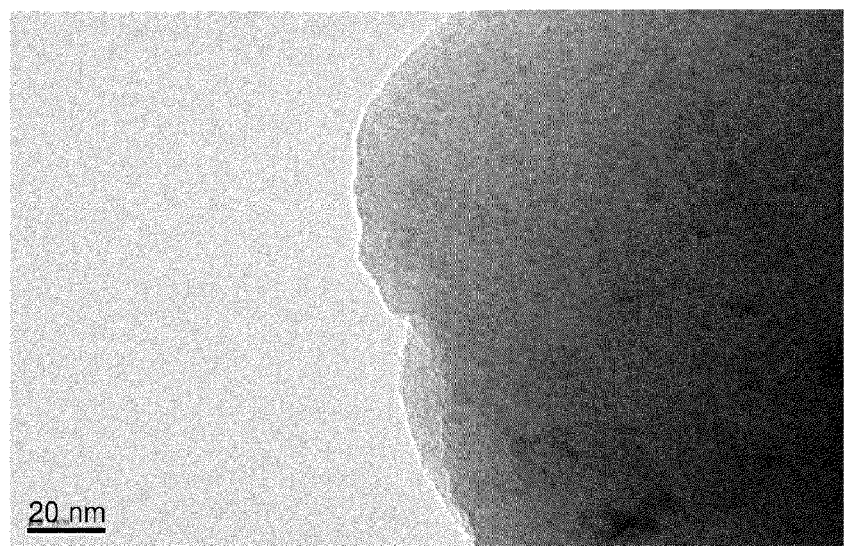
FIGS. 8A and 8B are TEM images of the anode active material of Example 10.
Figure 8B:
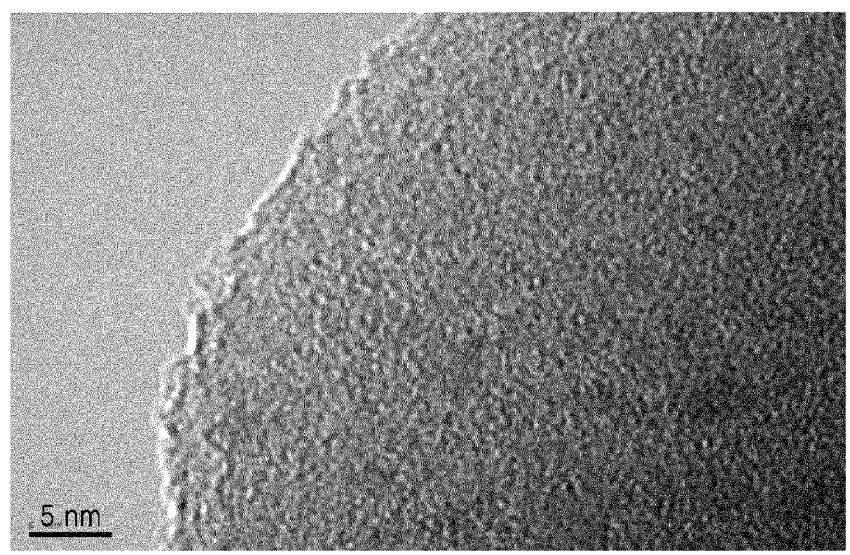
Figure 9A:
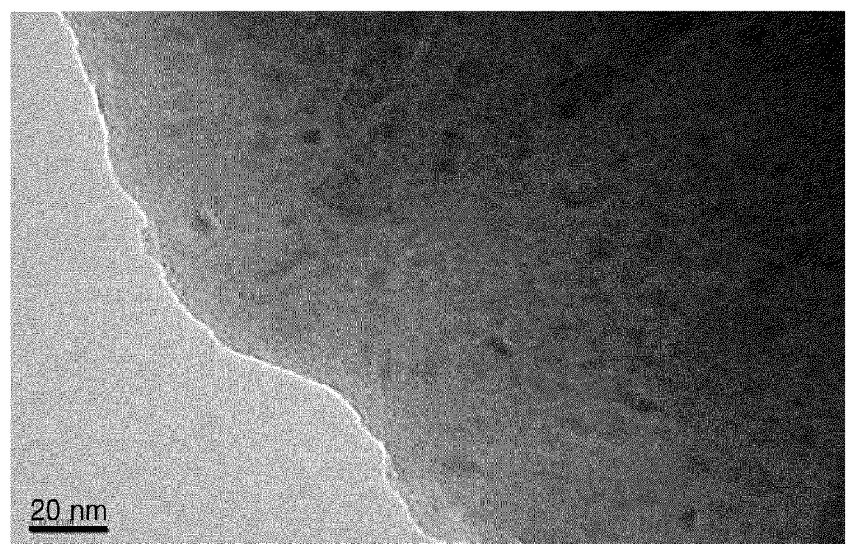
FIGS. 9A and 9B are TEM images of the anode active material of Example 12.
Figure 9B:
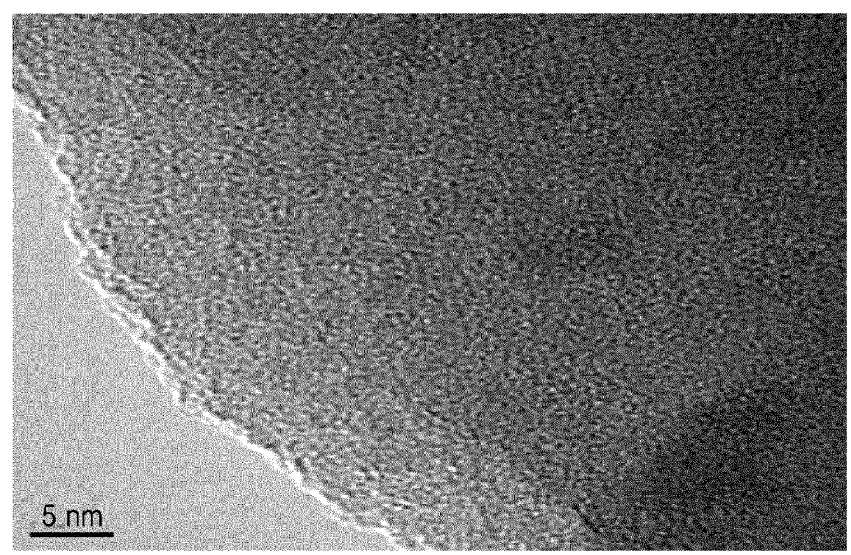
Figure 10A:
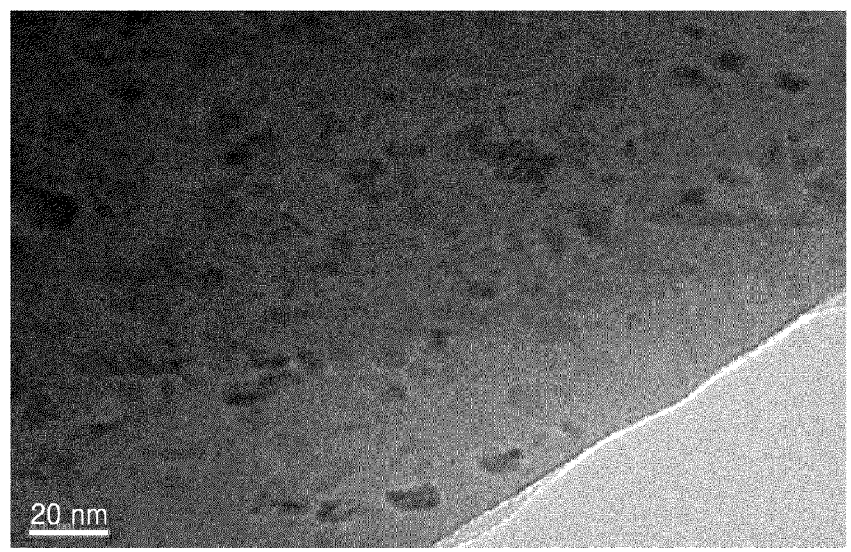
FIGS. 10A and 10B are TEM images of the anode active material of Example 13.
Figure 10B:
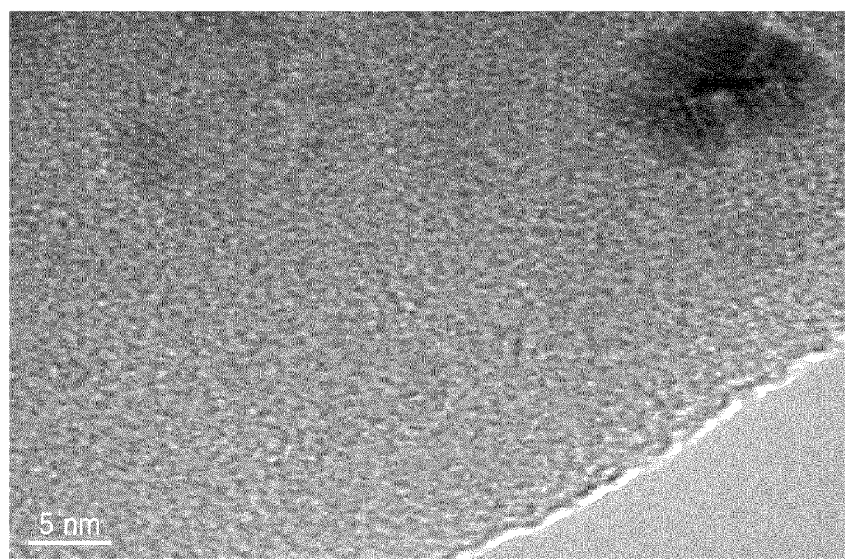
Figure 11A:
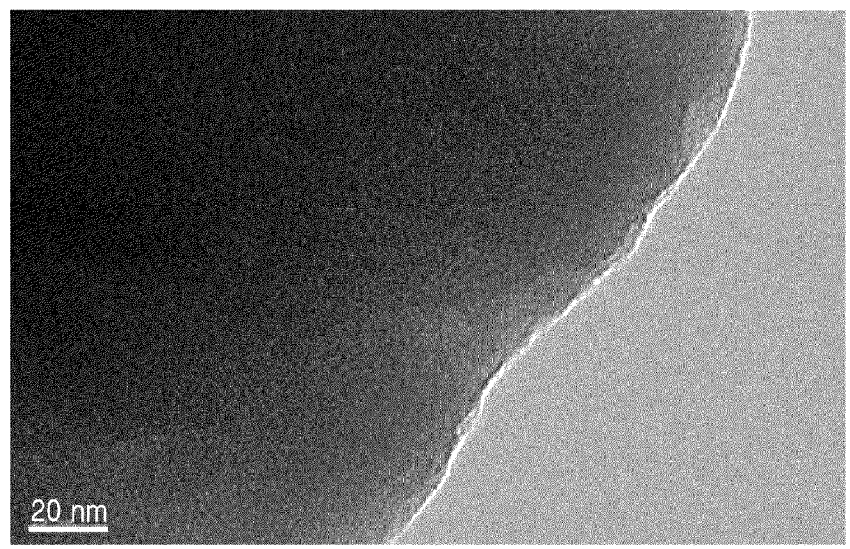
FIGS. 11A and 11B are TEM images of the composition for forming an anode active material film before thermal treatment to form the anode active material of Example 1.
Figure 11B:
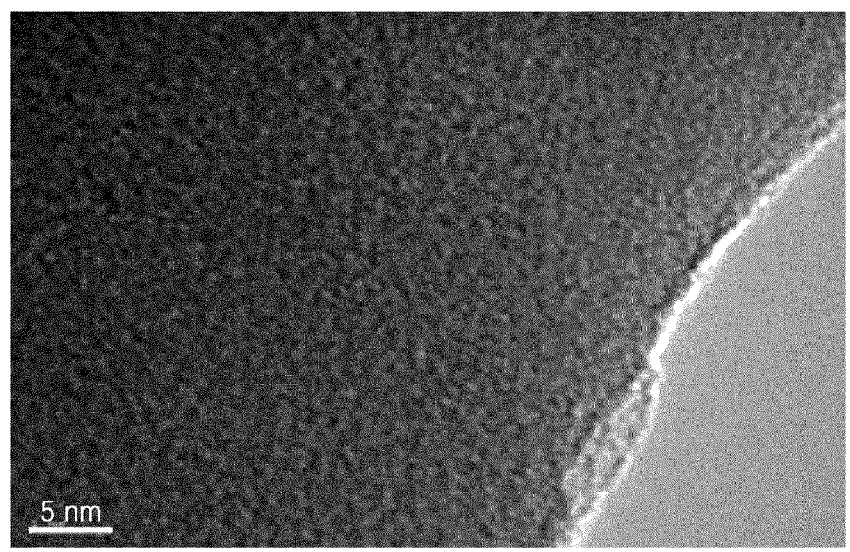

The anode active materials of Example 1 and Examples 10 to 13 were analyzed by transmission electron microscopy (TEM). The results are shown in FIGS. 7A, 7B, 8A, 8B, 9A, 9B, 10A, 10B, 11A, and 11B, and Table 1. In particular, FIGS. 7A and 7B are TEM images of the anode active material of Example 1, FIGS. 8A and 8B are TEM images of the anode active material of Example 10, FIGS. 9A and 9B are TEM images of the anode active material of Example 12, FIGS. 10A and 10B are TEM images of the anode active materials of Example 13, FIGS. 11A and 11B are TEM images of the composition for forming an anode active material film before the thermal treatment in preparing the anode active material of Example 1.

Average sizes of silicon crystals of the anode active materials of Example 1 and Examples 10 to 13 were measured by TEM. The results are shown in Table 1.

TABLE 1

| Example | Thermal treatment temperature (° C.) | Average size of silicon crystals [nm] |
|---|---|---|
| Example 1 | 1300 | 17.5 |
| Example 10 | 1100 | 4.5 |
| Example 11 | 1150 | 6.5 |
| Example 12 | 1200 | 8.5 |
| Example 13 | 1250 | 12.5 |

Referring to Table 1 and FIGS. 7A, 7B, 8A, 8B, 9A, 9B, 10A, 10B, 11A, and 11B, it was found that as the thermal treatment temperature of the composition for forming an anode active material film was increased to a temperature of about 1100° C. to about 1300° C., the average size of the silicon crystals in the anode active material gradually increased.

Evaluation Example 5

X-Ray Diffraction (XRD) Analysis

Figure 12A:
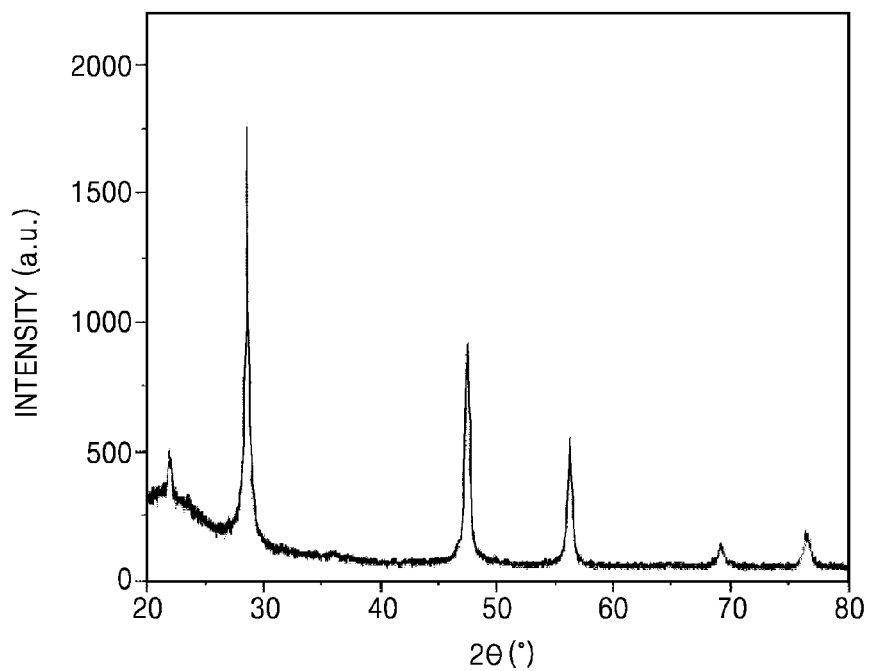
FIGS. 12A to 12E illustrate X-ray diffraction analysis results of the anode active materials of Example 1 and Examples 10 to 13, respectively.
Figure 12B:
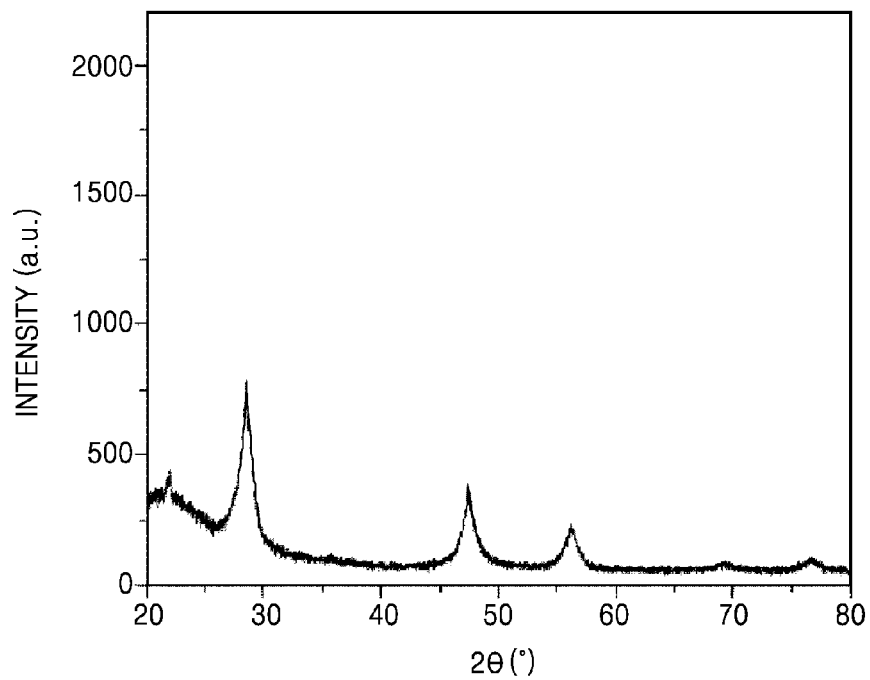
Figure 12C:
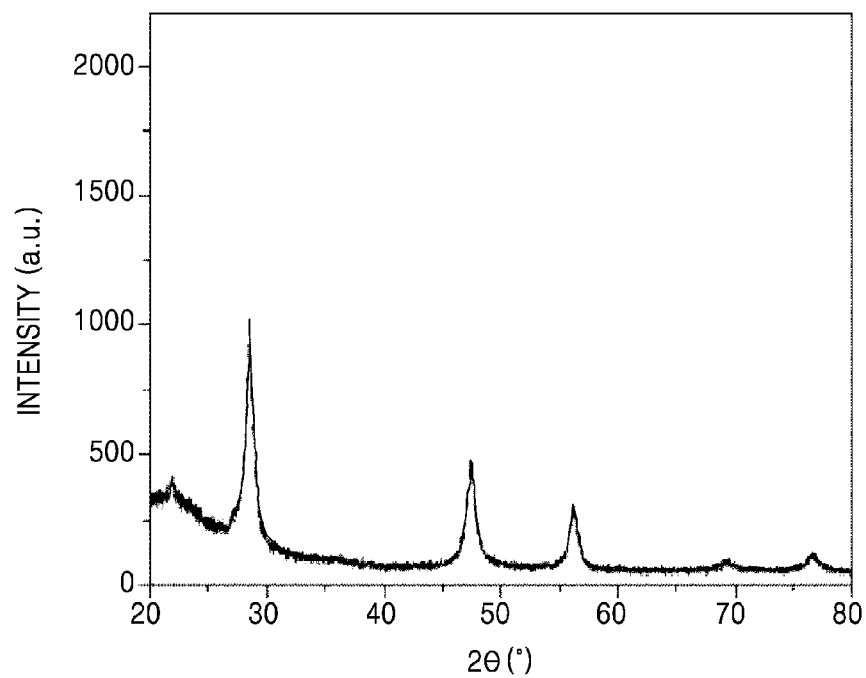
Figure 12D:
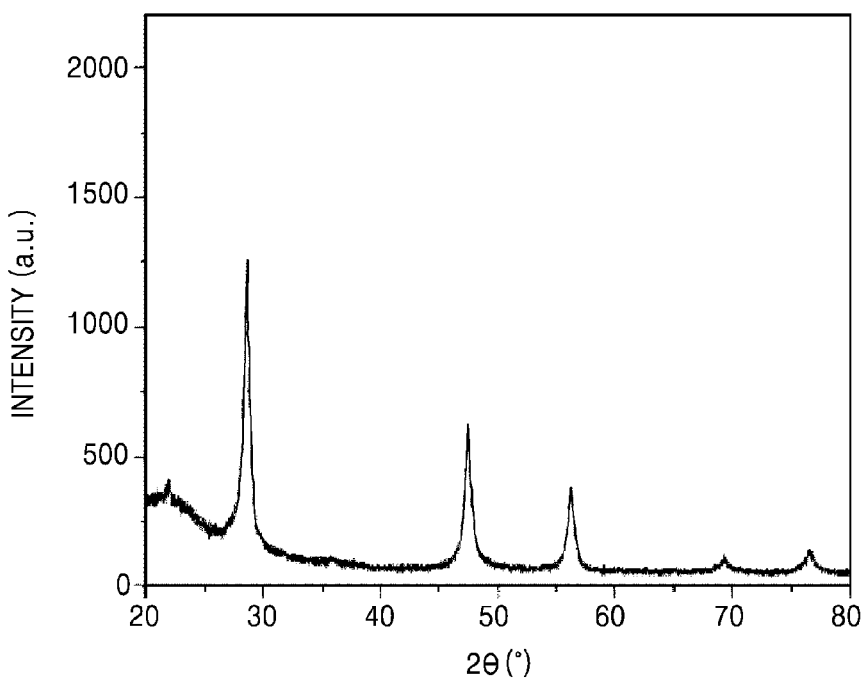
Figure 12E:
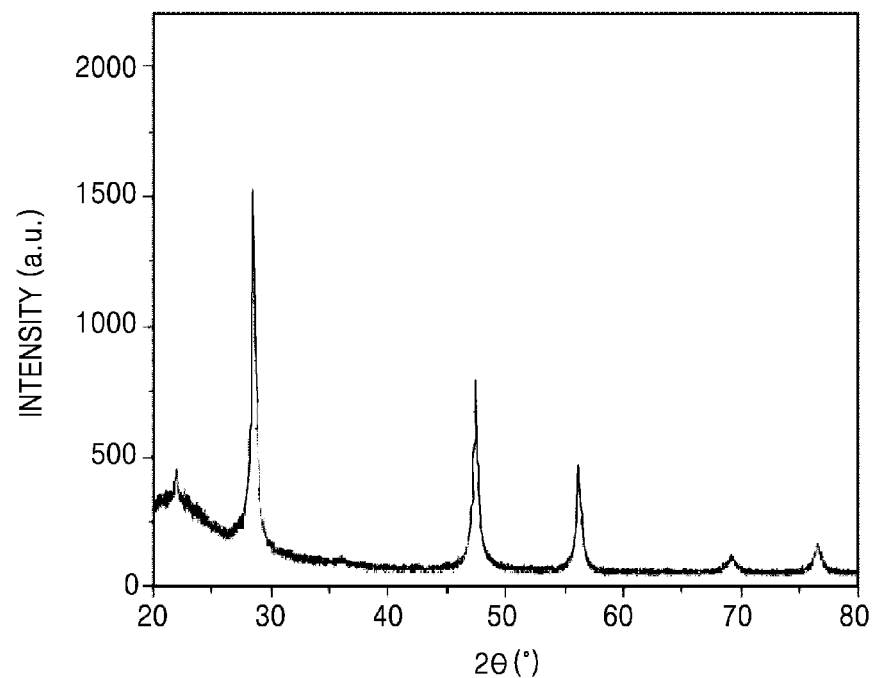
Figure 12F:
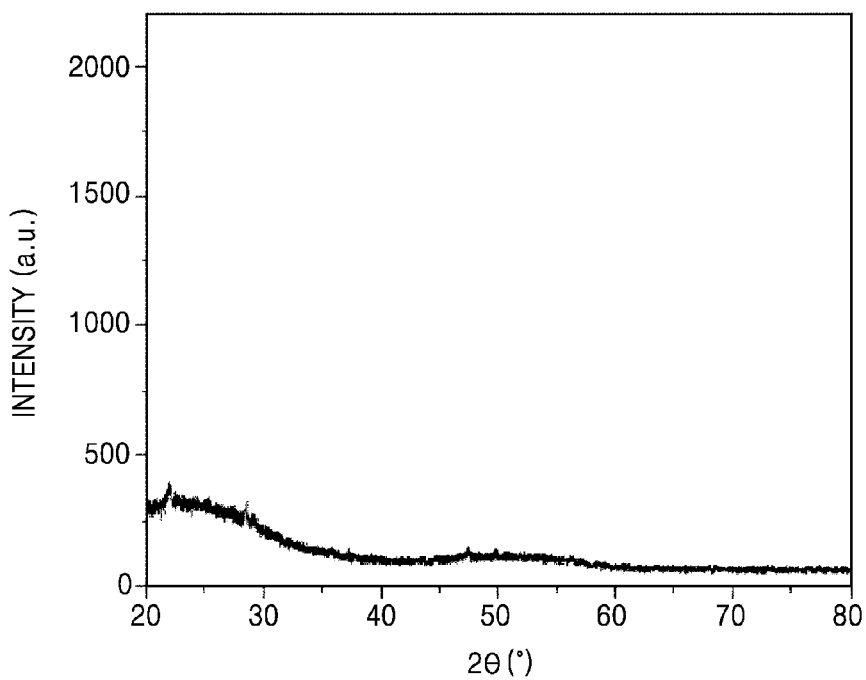
FIG. 12F illustrates X-ray diffraction analysis results before the thermal treatment to prepare the anode active material of Example 1.

The anode active materials of Example 1 and Examples 10 to 13 were analyzed by X-ray diffraction analysis using a Philips X'Pert X-Ray Diffractometer with CuK-α radiation (1.541 Å). The results are shown in FIGS. 12A to 12F. In particular, FIGS. 12A to 12E illustrate the X-ray diffraction analysis results of the anode active materials of Example 1 and Examples 10 to 13, respectively. FIG. 12F illustrates the X-ray diffraction analysis results of the composition for forming an anode active material film before the thermal treatment to prepare the anode active material of Example 1.

Referring to FIGS. 12A to 12F, it was found that as the temperature of the thermal treatment of the composition for forming an anode active material film in an amorphous $SiO_x$ state was increased to a temperature of about 1100° C. to 1250° C. (Examples 10 to 13), the full width at half maximum (FWHM) of a peak at 2θ of about 28.5° was gradually reduced, indicating an increase in the crystal size of the anode active materials. As a result of measuring the sizes of silicon crystals after the thermal treatment of the composition for forming an anode active material film at about 1100° C. to 1300° C. to prepare the anode active materials, it was found that the average size of silicon crystals in the anode active material gradually increased as the thermal treatment temperature was increased.

Evaluation Example 6

Particle Size Analysis

Particle sizes of the anode active material of Example 1 were analyzed using a laser diffraction particle size analyzer. Particle diameters at the 10th, 50th, and 90th percentile volumes in the cumulative particle size distribution of the anode active material of Example 1 were represented as D10, D50, and D90, respectively. The results are shown in Table 2.

TABLE 2

| Particle size distribution | Particle diameter (μm) |
|---|---|
| D10 | 3.3 |
| D50 | 6.32 |
| D90 | 10.45 |
| D100 | 21.87 |

As described above, according to the one or more embodiments, an anode active material may provide improved initial efficiency and increased capacity through reaction with lithium as charging and discharging is repeated. A lithium secondary battery having improved lifetime characteristics may be obtained using the anode active material.

It should be understood that embodiments described herein should be considered in a descriptive sense only and not for purposes of limitation. Descriptions of features or aspects within each embodiment should typically be considered as available for other similar features or aspects in other embodiments.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While one or more embodiments have been described with reference to the figures, it will be understood by those of ordinary skill in the art that various changes in form and details may be made therein without departing from the spirit and scope of the inventive concept as defined by the following claims and equivalents thereof.

What is claimed is:

1. An anode active material for a lithium secondary battery, the anode active material comprising:
    a first composite comprising a large-particle diameter active silicon material having a crystal size of 24 nm to 40 nm, and
    a small-particle diameter active silicon material having a crystal size of 8 nm to 12 nm,
    both being dispersed in a matrix material having a center region comprising silicon oxide ($SiO_x$) (wherein $0<x\leq 2$),
    wherein the silicon oxide consists of crystalline silicon oxide, and
    an amount of the small-particle diameter active silicon material is 20 wt % to 80 wt % based on a total weight of the large-particle diameter active silicon material and the small-particle active silicon material.

2. An anode active material for a lithium secondary battery, the anode active material comprising:
    a composite comprising a large-particle diameter active silicon material having a crystal size of 24 nm or greater and a small-particle diameter active silicon material having a crystal size of 8 nm or greater dispersed in a matrix material having a center region comprising crystalline silicon oxide ($SiO_x$) (wherein $0<x\leq 2$); and
    a carbonaceous material in an amount of 75 wt % to 97 wt % based on the total amount of the composite and the carbonaceous material,
    the composite and the carbonaceous material being mixed together, and
    wherein an amount of the composite is 3 wt % to 25 wt % based on the total amount of the composite and the carbonaceous material.

3. The anode active material of claim 2, wherein the carbonaceous material is at least one selected from graphite, carbon black, graphite, carbon nanotubes, carbon nanofibers, graphene, pitch, and vacuum-grown carbon fibers.

4. An anode active material for a lithium secondary battery, the anode active material comprising:
    i) a first composite comprising at least two active silicon materials having different crystal sizes dispersed in a matrix material having a center region comprising crystalline silicon oxide ($SiO_x$) (wherein $0<x\leq 2$); and
    ii) a second composite comprising an active silicon material having a crystal size of 24 nm or greater, dispersed in a matrix material having a center region comprising crystalline silicon oxide ($SiO_x$) (wherein $0<x\leq 2$),
    wherein the second composite is mixed with a carbonaceous material, and
    wherein the carbonaceous material is present in an amount of 75 wt % to 97 wt % based on the total amount of the second composite and the carbonaceous material,
    wherein an amount of the first composite is 30 wt % to 50 wt % based on the total amount of the first composite, the second composite, and the carbonaceous material, and
    wherein the at least two active silicon materials having different crystal sizes comprise a large-particle diameter active silicon material and a small-particle diameter active silicon material, the large-particle diameter active silicon material having a crystal size of 24 nm to 40 nm, and the small-particle diameter active silicon material having a crystal size of 8 nm to 12 nm.

5. The anode active material of claim 4, wherein an amount of the second composite is 3 wt % to 25 wt % based on a total amount of the second composite and the carbonaceous material.

6. A lithium secondary battery comprising:
    a cathode comprising a cathode active material;
    an anode comprising an anode active material; and
    an electrolyte between the cathode and the anode,
    wherein the anode active material comprises:
    a first composite comprising a large-particle diameter active silicon material having a crystal size of 24 nm to 40 nm, and a small-particle diameter active silicon material having a crystal size of 8 nm to 12 nm, both being dispersed in a matrix material having a center region comprising silicon oxide ($SiO_x$) (wherein $0<x\leq 2$), wherein the silicon oxide consists of crystalline silicon oxide and an amount of the small-particle diameter active silicon material is 20 wt % to 80 wt % based on a total weight of the large-particle diameter active silicon material and the small-particle active silicon material;
    a second composite comprising an active silicon material having a crystal size of 24 nm or greater dispersed in a matrix material having a center region comprising crystalline silicon oxide (SiO$_x$) (wherein 0<x≤2); and a carbonaceous material, the second composite and the carbonaceous material being mixed together; or a combination of the first composite and the second composite with the carbonaceous material, the carbonaceous material being in an amount of 75 wt % to 97 wt % based on the total amount of the second composite and the carbonaceous material.

7. The anode active material of claim 1, wherein the large-particle diameter active silicon material having a crystal size of 24 nm to 40 nm and the small-particle diameter active silicon material having a crystal size of 8 nm to 12 nm are formed from amorphous silicon oxide having an average particle diameter of about 5 μm to about 7 μm and amorphous silicon material having an average particle diameter of about 5 μm to about 15 μm.

8. The anode active material of claim 2, wherein the large-particle diameter active silicon material has a crystal size of 24 nm to 40 nm and the small-particle diameter active silicon material has a crystal size of 8 nm to 12 nm and are formed from amorphous silicon oxide having an average particle diameter of about 5 μm to about 7 μm and amorphous silicon material having an average particle diameter of about 5 μm to about 15 μm.

9. The anode active material of claim 4, wherein the large-particle diameter active silicon material having a crystal size of 24 nm to 40 nm and the small-particle diameter active silicon material having a crystal size of 8 nm to 12 nm are formed from amorphous silicon oxide having an average particle diameter of about 5 μm to about 7 μm and amorphous silicon material having an average particle diameter of about 5 μm to about 15 μm.

10. The lithium secondary batter of claim 6, wherein the large-particle diameter active silicon material having a crystal size of 24 nm to 40 nm and the small-particle diameter active silicon material having a crystal size of 8 nm to 12 nm are formed from amorphous silicon oxide having an average particle diameter of about 5 μm to about 7 μm and amorphous silicon material having an average particle diameter of about 5 μm to about 15 μm.

* * * * *